Sept. 24, 1935.  C. R. HANNA  2,015,637

CINEMATOGRAPHIC APPARATUS

Original Filed April 4, 1930

WITNESSES:
E. C. Leiding.
Hymen Diamond

INVENTOR
Clinton R. Hanna.
BY F. W. Lyle.
ATTORNEY

Patented Sept. 24, 1935

2,015,637

UNITED STATES PATENT OFFICE 2,015,637

CINEMATOGRAPHIC APPARATUS

Clinton R. Hanna, Pittsburgh, Pa., assignor to Westinghouse Electric & Manufacturing Company, a corporation of Pennsylvania Original application April 4, 1930, Serial No. 441,583. Divided and this application January 6, 1933, Serial No. 650,408

2 Claims. (Cl. 88—17)

My invention relates to improvements in cinematographic apparatus and it has particular relation to picture-projecting systems.

The present invention is a division of my application, Serial No. 441,583, filed April 4, 1930 and assigned to the assignee of the present application.

It is an object of my invention to provide a film supporting and film-tensioning device for motion picture projection systems of a cinematographic machine of a type that shall cause the film projected to present a smooth and uniform surface to the optical projection apparatus.

Another object of my invention is to provide film-supporting and film-tensioning apparatus for a motion picture projection system of a type in which the film is curved in the region in which it cooperates with the elements of the optical projection apparatus.

A further object of my invention is to provide a film-tensioning device for a motion picture projection system of the type incorporating a curved film supporting surface.

More concisely stated it is an object of my invention to provide a mechanically simple and inexpensive picture gate for a motion picture projection system that shall so cooperate with the film as to cause it to present a uniform surface to the optical projection apparatus and that shall at the same time have no deleterious wearing effect on the film.

According to my invention, I provide a film gate incorporating a film-supporting surface, commonly designated as an aperture plate, having a predetermined curvature. I further provide a plurality of tensioned shoe-straps to cooperate with the aperture plate and to resiliently position the film on surface thereof. The film is advanced through the gate by a plurality of film-advancing claws that project through the aperture plate and engage the film and the shoe-straps are properly constructed to accommodate the claws.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawing, in which, Figure 1 is a view, in perspective, of a section of a machine wherein my improvement is embodied;

Figure 1:
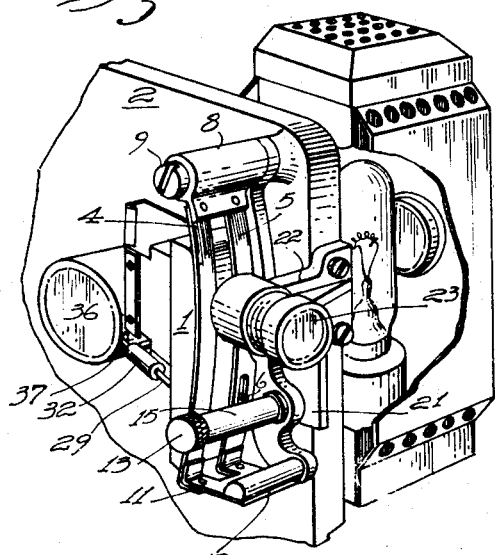
Figure 4:
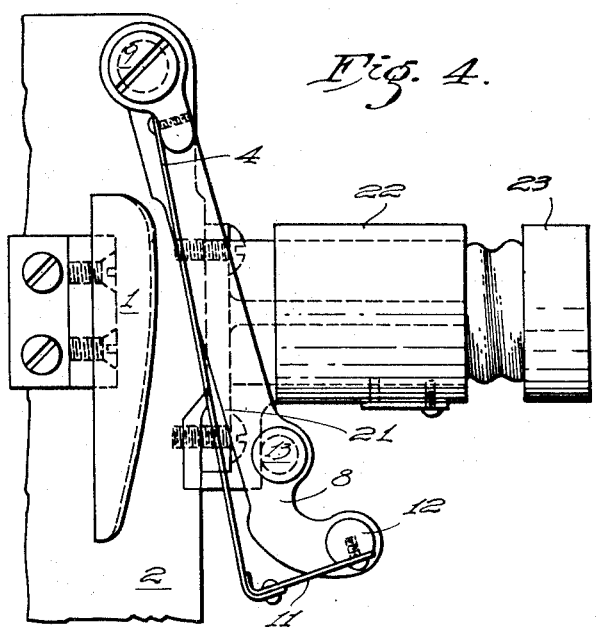
Fig. 4 is a view, in side elevation, showing the gate in open position.
Figure 2:
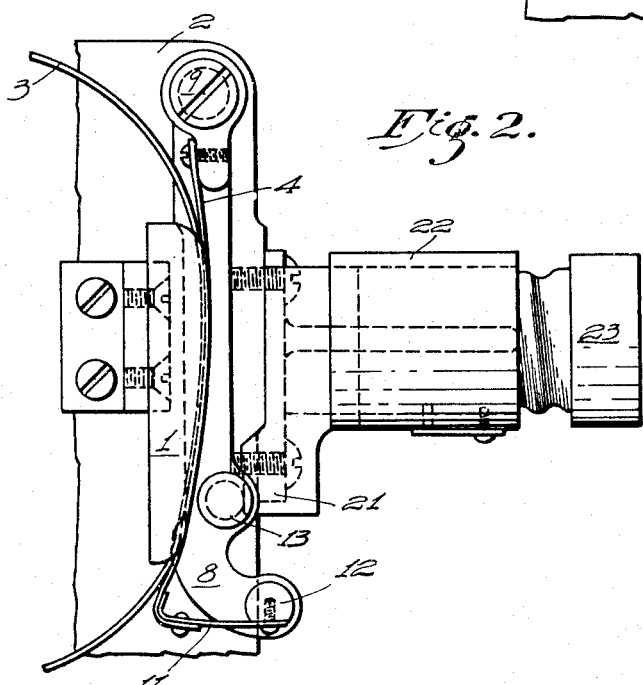
Fig. 2 is a view, in side elevation, of the improved film-gate embodied in the machine.
Figure 5:
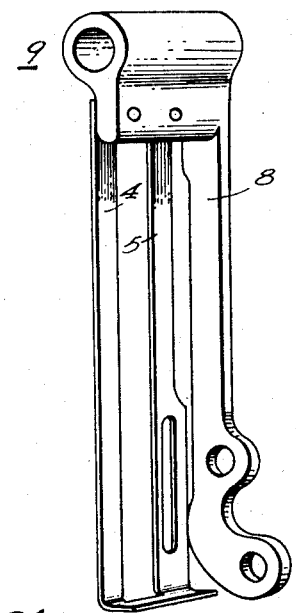
Fig. 5 is a view, in perspective, showing the shoe-straps and the shoe-strap support embodied in the film gate.
Figure 3:
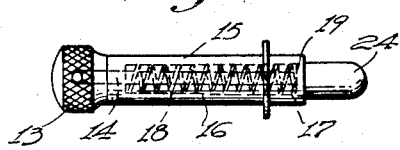
Fig. 3 is a view, in side elevation, showing a device whereby the shoe-supporting bracket is moved.

The apparatus shown in the drawing comprises a curved aperture plate supported on the main plate 2 of a cinematographic machine, on which a film-strip 3 is positioned by a plurality of tensioned shoe-straps 4 and 5 and over which it is intermittently advanced by a plurality of claws 6.

The shoe-straps 4 and 5 are rigidly fastened to a bracket 8 pivotally supported on a stud 9 projecting from the main plate 2 of the machine, and they are held in tension by a plurality of flat springs 11 fastened, at one end, to the straps and, at the other end, to a finger 12 riveted to the strap-supporting bracket 8.

A knurled knob 13, pinned to a shaft 14 that is slidably supported in a sleeve 15 riveted to the bracket 8, is provided for moving the shoe straps 4 and 5 relative to the plate 1. The sleeve 15 is equipped with a cavity wherein a spring 17 is disposed. The latter engages an inwardly-extending shoulder 18 in the sleeve 15 and a shoulder 19 on the shaft 14 and resiliently urges the shaft 14 into engagement with a finger 21 projecting downward from a bracket 22 that supports a projection lens 23.

The projecting end 24 of the shaft 14 coacts with the inner end of the finger 21 to hold the shoe-strap bracket 8 in closed position and it reacts with the outer end of the finger 21 to hold it in open position. By exerting an axial force on the knob 13, opposite in direction to the force exerted by the spring 16, the shaft 14 may be disengaged from the bracket 21. However, when the knob is released, the shaft, if unconstrained, automatically returns to one of its engaging positions.

In the particular embodiment of my invention described herein, the intermittently-operating claws 6, in advancing the film 3, coact with the sprocket holes on one of its sides only. On the other hand, the shoe-straps 4 and 5 engage the film on its margin where the sprocket holes are ordinarily situated. Since the claws must be provided with an unobstructed passage through the film, the shoe strap 5, on the side of the film on which the engagement takes place, is distended and slotted in the region where the claws traverse the film.

The intermittent movement does not involve the present invention and need not be described in detail herein. However, briefly, it comprises a peripheral cam (not shown) which cooperates with a cam-follower (not shown) to motivate a rod 29 to which the claws 6 are secured. The rod 29 traverses a pivotally supported sleeve 32 and as the cam is rotated and cooperates with the cam-followers the rod pivots and slides and in so moving advances the claws 6 to engage the film 3, moves the claws downward to advance the film, retracts the claws to disengage the film and moves the claws upward in preparation for a further advancement of the film.

The cam and cam-follower are enclosed in a casing 36 and the rod 29 projects through an opening 37 in the casing.

The particular structure of the intermittent movement and its advantages are explained in the parent application. It is to be noted, however, that the intermittent movement is of such structure that the ratio of film-moving to film-resting time is small and it follows the film is advanced through the film gate at a considerable velocity and with considerable acceleration. By reason of these features the film gates of the prior art were found to be rather unsatisfactory in the present instance and the film gate described herein was developed to eliminate the difficulties which arose in utilizing the earlier gates.

Although I have shown and described certain specific embodiments of my invention, I am fully aware that many modifications thereof are possible.

My invention, therefore, is not to be restricted except insofar as is necessitated by the prior art and by the spirit of the appended claims.

I claim as my invention:

1. A film gate assembly comprising a supporting plate, an aperture plate mounted on said supporting plate, a plurality of longitudinally tensioned shoe straps, a supporting bracket for said shoe straps pivotally mounted on said supporting plate adjacent to said aperture plate, a stud mounted on said bracket for manually pivoting said bracket and a block mounted on said supporting plate in proximity of said aperture plate, said block to engage said stud on one side to maintain said tensioned shoes in engagement with said aperture plate and to engage said stud on the opposite side to maintain said shoes out of engagement with said aperture plate.

2. A film gate assembly comprising a supporting plate, an aperture plate mounted on said supporting plate, a plurality of shoes to exert a pressure on a film disposed on said aperture plate, a supporting bracket for said shoes pivotally mounted on said supporting plate, a stud mounted in said bracket for manually pivoting said bracket and a block mounted on said supporting plate in the proximity of said aperture plate, said block to engage said stud on one side to maintain said shoes in engagement with said aperture plate and to engage said stud on the opposite side to maintain said shoes out of engagement with said aperture plate.

CLINTON R. HANNA.